United States Patent Office 2,900,262
Patented Aug. 18, 1959

2,900,262

CORROSION PREVENTIVE COMPOSITIONS

Harold A. Green, Elkins Park, Pa., assignor to Quaker Chemical Products Corporation, Conshohocken, Pa., a corporation of Pennsylvania No Drawing. Application December 15, 1955
Serial No. 553,199

11 Claims. (Cl. 106—14)

This invention relates to corrosion preventing compositions which tend to prevent rusting and corrosion of metal surfaces when applied thereto in the form of a coating.

As is well known, petroleum hydrocarbon films afford only limited protection to metal surfaces against rusting or corrosion and in general do not provide adequate protection against corrosion in humid and corrosive atmospheres. Therefore, it has been common practice to employ corrosion inhibitors or anticorrosion additives as constituents in petroleum hydrocarbon compositions for this purpose. However, the additives heretofore employed in this manner have not proved entirely satisfactory. Certain of these additives, while satisfactory for use in petroleum hydrocarbon compositions, which are employed in the presence of relatively pure humid atmosphere, do not provide adequate protection under extreme service conditions where additional procorrosives are present.

A primary object of this invention is to provide improved corrosion preventive compositions which protect metal surfaces, and particularly ferrous surfaces, with which they are in contact against rusting and corrosion under extreme conditions of service during storage, handling and shipping. Another object of this invention is to provide corrosion preventive compositions which are capable of protecting metal surfaces under extreme conditions of moisture and humidity. A further object of this invention is to provide corrosion preventive compositions which are capable of protecting metal surfaces when exposed to industrial atmospheres which are normally polluted with procorrosive constituents, i.e., $SO_2$, organic acids, etc. A still further object of this invention is to provide corrosion preventive compositions which are capable of protecting metal surfaces under extreme conditions of moisture and humidity in industrial atmospheres which are polluted with procorrosive constituents, i.e., $SO_2$, organic acids, etc.

I have found compositions having the above desirable characteristics may be produced by the reaction product of an oxygenated petroleum hydrocarbon with a condensation product resulting from the reaction of a suitable monocarboxylic acid or fatty acid glyceride with a suitable polyamine containing at least two primary or secondary amino groups.

The corrosion inhibiting compositions are produced by simple mixing of the constituents, at a temperature slightly above the melting point of the higher melting point constituent, until the reaction is complete.

If a monocarboxylic acid is employed, the polyamine-monocarboxylic acid reaction product is obtained by heating the reactants at an elevated temperature at atmospheric or reduced pressure, or azeotropic distillation using for example xylol or toluol to effect dehydration. However, complete dehydration is not required to produce products which are effective within the scope of this invention. The initial reaction temperature depends on the materials employed and is generally within the range of 150 to 160° C. The final reaction temperature depends upon the degree of dehydration desired, and whether the removal of water is carried out at reduced or atmospheric pressure.

Suitable condensation products may also be made by condensing the polyamine with a fatty acid glyceride at 150 to 160° C. The reaction may be carried to completion by heating at still higher temperatures at atmospheric or reduced pressure, or by azeotropic distillation using xylene or toluol to effect dehydration.

In general, it has been found that increased solubility in petroleum hydrocarbons of the corrosion inhibitors contemplated by this invention is obtained with an increase in the degree of dehydration of the condensation products from which they are prepared, although suitable inhibitors may be prepared from condensates resulting from only partial dehydration.

The molar ratio of monocarboxylic acid or fatty acid glyceride to polyamine employed depends upon the number of primary and secondary amino groups present in the polyamine and the number of carbon atoms in the acyl group used. In general, it is desirable to incorporate one to two acyl groups per mol of polyamine, but I do not desire to be limited to these compositions in this invention.

Examples of suitable polyamines which can be used as reactants to form the condensation products employed in the present invention include ethylene diamine and polyalkylene polyamines, such as diethylene triamine, triethylene tetramine, tetraethylene pentamine and higher polyethylene polyamines 1,3-propylene diamine, tripropylene tetramine, tetrapropylene pentamine, and higher polypropylene polyamines, as well as substituted polyalkylene polyamines, such as hydroxyethyl ethylenediamine, hydroxyisopropyl propylene diamine, etc.

Any fatty acid, or mixture of fatty acids, containing from 8 to 22 carbon atoms may be used to produce the condensation products which are effective in the compositions described in this invention. Examples of such monocarboxylic acids are oleic, linoleic, linolenic, tall-oil fatty acids, naphthenic acids, abietic acids, caprylic acid, lauric acid, palmitic acid, stearic acid, arachidic acid, and behenic acids.

Suitable fatty glycerides which may be used to form the condensation products employed herein are tallow, coconut oil, soybean oil, lard oil, cottonseed oil, castor oil, peanut oil, menhaden oil, etc., in which acyl groups in the range of from 12 to 22 carbon atoms predominate.

The petroleum hydrocarbon oxidate contemplated for use in this invention may contain a mixture of high molecular weight aliphatic acids, hydroxycarboxylic acids, alcohols, keto-alcohols, keto-acids, esters, lactones, ketones, and hydrocarbons obtained by partial oxidation. Typical of these useful oxygenated hydrocarbons are those commercially available under the trade name of "Alox" manufactured by the Alox Corporation, Niagara Falls, New York. These oxidized hydrocarbons are derived from the controlled oxidation of petroleum and consists essentially of mixtures of organic acids and their esters ranging from $C_5$ to $C_{35}$. They also contain high molecular weight alcohols, lactones, ketones and alcohol-ketones. Their preparation is described in the following U.S. patents: 1,690,768 and 1,690,769. In general, these oxygenated petroleum hydrocarbons have a mean molecular weight in the range of 200 to 600, acid number in the range of 10 to 200, saponification number in the range of 40 to 300, and an unsaponifiable content in the range of 10 to 70 percent by weight.

In practice, it has been found that the corrosion inhibiting additives useful in this invention have limited solubility in certain fractions of petroleum hydrocarbons. It has been found advantageous in such cases to include in these compositions minor amounts of "oil-soluble"

surface-active agents which promote the solubility of the corrosion inhibiting additives in these petroleum hydrocarbons. Examples of such "oil-soluble" solubilizing agents are petrolum sulfonates, fatty acid esters of polyhydric alcohols and polyoxyethylene derivatives thereof, etc.

While it has been noted that some "oil-soluble" solubilizing agents are detrimental to the corrosion inhibiting effectiveness of the additives contemplated in this invention, certain fatty acid esters of hexitans and hexides obtained by dehydrating sorbitol, such as sorbitan mono-oleate are especially suitable as solubilizing agents. These materials do not alter the corrosion inhibiting effectiveness of the compositions described in this invention. These "oil-soluble" solubilizing additives in themselves are not effective corrosion inhibitors in petroleum hydrocarbon compositions in protecting metal surfaces exposed to polluted industrial atmospheres containing $SO_2$, organic acids, etc.

The preparation of the essential components of my corrosion preventative compositions will now be described in the following illustrative embodiments of my invention.

A. PREPARATION OF AMINE CONDENSATION PRODUCT

A reaction product of a monocarboxylic acid and a polyethylene polyamine was prepared as follows:

284 grams of stearic acid and 80 grams of triethylenetetramine were placed in a three-neck glass reactor equipped with heater, stirrer, thermometer, and reflux condenser fitted above a distillate trap. The reactants were then heated at atmospheric pressure with stirring. Initial temperature at which distillate was collected was 150° C. The temperature was raised over a period of 90 minutes to a final temperature of 210° C. which was maintained until practically no further distillate was collected. Eighteen grams of distillate were collected which were found to contain 1.7% of amines. The product obtained in this manner had the following properties: M.P. 95° C., neutralization equivalent (methyl orange end pt.) 348.

B. PREPARATION OF AMINE-GLYCERIDE CONDENSATION PRODUCT

A reaction product of a fatty acid glyceride and a polyethylene polyamine was prepared as follows:

295 grams of hydrogenated tallow glyceride and 53.5 grams of diethylene-triamine were placed in a three-necked glass reactor equipped with heater, stirrer, thermometer and reflux condenser fitted above a distillate trap. The reactants were heated at atmospheric pressure with stirring for thirty minutes at 150–160° C. 85 mols. of toluol were added and the mixture refluxed for 3½ hours until practically no additional water was obtained. The final temperature was 166° C. 10.5 grams of distillate were collected containing 7.9% amines. The toluol was then removed by distillation to a final temperature of 200° C. at a reduced pressure of 25 mm. of Hg.

I may, if preferred, use a corresponding molecularly equivalent amount of triethylene tetramine instead of the diethylene triamine above employed. In general, I may use a ratio of from 1 to 2 mols. of glyceride to 3 mols. of polyamine.

C. PREPARATION OF CORROSION PREVENTIVE PRODUCT

The corrosion preventive product of my invention is formed as a reaction product of an oxygenated hydrocarbon previously described and a polyamine condensation product prepared as described previously.

75 grams of a petroleum hydrocarbon oxidate having a mean molecular weight of approximately 270, acid No. of 170, and saponification No. of 205 were mixed with the product described under Preparation A above and heated to slightly above the melting point of the condensate, i.e., at 95° C. with stirring until a homogeneous liquid was obtained. The oxidized petroleum hydrocarbon described above is sold under the trade name of "Alox 825." Instead of "Alox 825," I may use "Alox 600" which is also derived from the controlled oxidation of fractions of petroleum and containing small amounts of free organic acids and relatively large amounts of alcohols, polyalcohols and ketones, with substantial amounts of lactones and esters of high molecular weight. It has a mean molecular weight of about 545 to 575, an acid number of 15 to 25, saponification number of 60 to 110, and an unsaponifiable content of 60 to 70% by weight.

I may also use "Alox 700" which is likewise a petroleum hydrocarbon oxidate containing a mixture of alcohols, alcohol-ketones, fatty acids and lactones. It has a mean molecular weight of about 560 to 590, an acid number of 30 to 45, saponification number of 90 to 140, and an unsaponifiable content of 40 to 50% by weight.

I may use other petroleum oxidates which differ in mean molecular weight, acid number, saponification number, and unsaponifiable content.

The preferred corrosion preventive product of my invention is substantially as described above in which the amount of petroleum hydrocarbon oxidate is reacted in the ratio of 2 to 3 parts by weight to one part by weight of the amine condensation product. However, a ratio of 10/1 or higher may be effectively employed. Furthermore, the ratio of oxygenated petroleum hydrocarbon to the amine condensation product is dependent upon the properties of the oxidate and condensate employed. Therefore, I do not intend to be limited to the specific ratios outlined.

D. CORROSION PREVENTIVE COMPOSITION

A corrosion preventive petroleum hydrocarbon composition may be prepared using the product described under paragraph C above together with an "oil-soluble" solubilizing agent to prevent physical separation as outlined below:

| | Weight Percent |
|---|---|
| "Stoddard Solvent" | 80 |
| Reaction product of paragraph C | 17 |
| Sorbitan mono-oleate | 3 |

Instead of sorbitan mono-oleate, I may use other solubilizing agents such as sorbitan tri-oleate, sorbitan sesquioleate, glyceryl mono-oleate, etc. The "Stoddard Solvent" is a liquid hydrocarbon mixture, primarily aliphatic in nature, boiling between about 320° and 400° F., and defined by A.S.T.M. Standards Specification D 484-52. This corrosion preventive composition is suitable for use by direct application to metals in any suitable conventional manner for protection against corrosion. The above composition may be added to petroleum oil in any suitable amounts, preferably from about 1 to 6% by weight, so that the effective corrosion preventive product (prepared under paragraph C) is present in amounts of about 2 to about 5% by weight.

The use of a solubilizing agent is not limited to compositions which employ "Stoddard Solvent." A solubilizing agent may also be used with petroleum hydrocarbon fractions such as kerosene, mineral seal oil, etc.

An illustrative corrosion preventive composition made in accordance with my invention is made from the following constituents in percent by weight:

| | Percent |
|---|---|
| Alox 825 | 11 |
| Amine condensate (under paragraph A) | 4 |
| Sorbitan mono-oleate | 3.3 |
| Mineral oil (100 Saybolt Universal secs. visc. at 100° F.) | 81.7 |

The Alox 825 and amine condensate are reacted under the conditions as given in paragraph C above with or without a small amount of mineral oil, and the balance of the mineral oil and sorbitan mono-oleate are added to the product.

I have found it advantageous to use liquid corrosion preventive compositions for ferrous metal surfaces resulting from the reaction of from 1 to 15 parts by weight of an oxygenated petroleum hydrocarbon having a mean molecular weight in the range of 250 to 300, an acid number in the range of 150 to 190, a saponification number in the range of 185 to 225, and an unsaponifiable content from 10 to 15% by weight with one part by weight of the product obtained from the condensation, under dehydrating conditions of 1.0 to 2.0 mols of stearic acid to 1 mol of triethylene tetramine; and a polyhydric alcohol ester of a higher fatty acid, this last component being present in a minor amount but sufficient in quantity to render the composition homogeneous. I may equally as well employ the condensation product of a hydrogenated tallow glyceride with triethylene tetramine in the molar ratio of 1 to 2 mols. of glyceride to 3 mols. of amine.

The following Table I gives examples showing the effect of my corrosion preventive composition applied to cold rolled steel test panels.

Table I

| Composition | Added Agent | Degree of Rusting |
|---|---|---|
| Uninhibited mineral oil (100 vis. Saybolt). | none | heavy rust. |
| Do | 2% compound of Paragraph C | no rust. |
| Do | 2% compound of Paragraph C and 0.4% sorbitan mono-oleate. | Do. |
| Do | 2% sorbitan mono-oleate | heavy rust. |

The method employed in testing and demonstrating the efficiency of the corrosion preventive compositions of this invention is a modification of the testing procedure described by Preston, R. St. J. in the Journal of the Iron and Steel Institute, 160 (3), 286. In my test, two polished panels of SAE 1010, 20 gauge, cold rolled steel panels, 1 inch wide by 3 inches long, are coated with the corrosion preventive to be tested and allowed to drain for 4 hours. The panels are suspended together, with suitable controls, along the outside of a 2000 ml. beaker by means of Nichrome hooks. The beaker contains 1,500 ml. of distilled water containing 30 parts per million of $SO_2$ and 30 parts per million of acetic acid. The beaker and panels are covered by a bell jar and closed off by means of a water-seal. The entire apparatus is rotated on a turntable for twelve hours. The bell jar is then removed and the panels are examined and ranked as to the degree of rusting and staining. This test shows good correlation with results obtained in outdoor shed exposure tests, and is a rapid method of determining the practical effectiveness of the corrosion preventive compositions contemplated herein.

It will be apparent that numerous modifications and changes may be made in the specfic procedures and examples described which are intended to be included within the scope of the appended claims.

I claim:

1. A liquid corrosion preventive composition for metal surfaces consisting essentially of a petroleum hydrocarbon and the reaction product of from 1 to 15 parts by weight of a petroleum hydrocarbon oxidate with 1 part by weight of the product obtained from condensation under dehydrating conditions of about 1 to 2 mols of a mono carboxylic acid containing from 8 to 22 carbon atoms and about 1 mol of a polyalkylene polyamine selected from the group consisting of polyethylene polyamines and polypropylene polyamines containing from 2 to 4 alkylene groups and from 3 to 5 amino groups and hydroxyalkyl alkylene diamines containing from 2 to 3 carbon atoms in the alkyl group and from 2 to 3 carbon atoms in the alkylene group, said petroleum oxidate consisting essentially of a mixture of high molecular weight aliphatic acids, hydroxy-carboxylic acids, alcohols, keto-alcohols, keto-acids, esters, lactones, ketones and partially oxidized hydrocarbons having 5 to 35 carbon atoms, said oxidate having a mean molecular weight in the range of 200 to 600, acid number in the range of 10 to 200, saponification number in the range of 40 to 300 and an unsaponifiable content in the range of 10 to 70 percent by weight.

2. Composition according to claim 1 in which the polyalkylene polyamine is triethylene tetramine.

3. A liquid corrosion preventive composition for metal surfaces consisting essentially of a petroleum hydrocarbon and the reaction product of 1 to 15 parts by weight of petroleum hydrocarbon oxidate with 1 part by weight of the product obtained from the condensation, under dehydrating conditions, of 1 to 2 mols of a monocarboxylic acid and 1 mol of a polyalkylene polyamine selected from the group consisting of polyethylene polyamines and polypropylene polyamines containing from 2 to 4 alkylene groups and from 3 to 5 amino groups and hydroxyalkyl alkylene diamines containing from 2 to 3 carbon atoms in the alkyl group and from 2 to 3 carbon atoms in the alkylene group, and a polyhydric alcohol ester of a higher fatty acid, said last mentioned component being present in a minor amount but sufficient in quantity to render the composition homogeneous, said petroleum hydrocarbon oxidate consisting essentially of a mixture of high molecular weight aliphatic acids, hydroxy-carboxylic acids, alcohols, keto-alcohols, keto-acids, esters, lactones, ketones and partially oxidized hydrocarbons having 5 to 35 carbon atoms, said oxidate having a mean molecular weight in the range of 200 to 600, acid number in the range of 10 to 200, saponification number in the range of 40 to 300 and an unsaponifiable content in the range of 10 to 70 percent by weight.

4. Composition according to claim 3 in which the polyhydric alcohol fatty acid ester is sorbitan mono-oleate.

5. A liquid corrosion preventive composition for metal surfaces consisting essentially of a petroleum hydrocarbon and the product resulting from the reaction of 1 to 15 parts by weight of petroleum hydrocarbon oxidate having a mean molecular weight in the range of 250 to 300, acid number in the range of 150 to 190, saponification number in the range of 185 to 225, and an unsaponifiable content of from 10 to 15 percent by weight with 1 part by weight of the reaction product obtained from the condensation, under dehydrating conditions, of from 1 to 2 mols of stearic acid with 1 mol of triethylene tetramine.

6. A liquid corrosion preventive composition for metal surfaces consisting essentially of a petroleum hydrocarbon and the reaction product of from 1 to 15 parts by weight of petroleum hydrocarbon oxidate having a mean molecular weight in the range of 250 to 300, acid number in the range of 150 to 190, saponification number in the range of 185 to 225, and an unsaponifiable content of from 10 to 15 percent by weight with one part by weight of the product obtained from the condensation, under dehydrating conditions, of 1.0 to 2.0 mols of stearic acid to 1 mol of triethylene tetramine, and a polyhydric alcohol ester of a higher fatty acid, this last component being present in a minor amount but sufficient in quantity to render the composition homogeneous.

7. A liquid corrosion preventive composition for metal surfaces consisting essentially of a petroleum hydrocarbon and the product resulting from the reaction of 1 to 15 parts by weight of petroleum hydrocarbon oxidate having a mean molecular weight in the range of 250 to 300, acid number in the range of 150 to 190, saponification number in the range of 185 to 225, and an unsaponifiable content of from 10 to 15 percent by weight with one part by weight of the product obtained from the condensation, under dehydrating conditions, of from 1.0 to 2.0 mols of hydrogenated tallow glyceride with 3 mols. of triethylene tetramine.

8. A liquid corrosion preventive composition for metal surfaces consisting essentially of a petroleum hydrocarbon and the reaction product of from 1 to 15 parts by weight of petroleum hydrocarbon oxidate having a mean molecular weight in the range of 250 to 300, acid number in the range of 150 to 190, saponification number in the range of 185 to 225, and an unsaponifiable content of from 10 to 15 percent by weight with one part by weight of the product obtained from the condensation, under dehydrating conditions, of from 1.0 to 2.0 parts of hydrogenated tallow glyceride to 3 mols of triethylene tetramine, and a polyhydric alcohol ester of a higher fatty acid, said last component being present in a minor amount but sufficient in quantity to render the composition homogeneous.

9. Composition according to claim 6 in which the polyhydric alcohol fatty acid ester is sorbitan monooleate.

10. Composition according to claim 8 in which the polyhydric alcohol fatty acid ester is sorbitan monooleate.

11. A liquid corrosion preventive composition for metal surfaces consisting essentially of a petroleum hydrocarbon and a corrosion preventive agent in amount of about 1 to 6 percent by weight of the reaction product of petroleum hydrocarbon oxidate with the condensation product, under dehydrating conditions, of 1 mol of a polyalkylene polyamine selected from the group consisting of polyethylene polyamines and polypropylene polyamines containing from 2 to 4 alkylene groups and from 3 to 5 amino groups and hydroxyalkyl alkylene diamines containing from 2 to 3 carbon atoms in the alkyl group and from 2 to 3 carbon atoms in the alkylene group and 1 to 2 mols of a compound selected from the group consisting of fatty monocarboxylic acids and their glycerides, said petroleum hydrocarbon oxidate consisting essentially of a mixture of high molecular weight aliphatic acids, hydroxy-carboxylic acids, alcohols, keto-alcohols, keto-acids, esters, lactones, ketones and partially oxidized hydrocarbons having 5 to 35 carbon atoms, said oxidate having a mean molecular weight in the range of 200 to 600, acid number in the range of 10 to 200, saponification number in the range of 40 to 300 and an unsaponifiable content in the range of 10 to 70 percent by weight.

References Cited in the file of this patent

UNITED STATES PATENTS

| | | |
|---|---|---|
| 2,400,785 | Rust | May 21, 1946 |
| 2,568,876 | White et al. | Sept. 25, 1951 |
| 2,580,036 | Matuszak | Dec. 25, 1951 |
| 2,772,174 | Riegler et al. | Nov. 27, 1956 |
| 2,785,078 | Keating et al. | Mar. 12, 1957 |